UNITED STATES PATENT OFFICE 2,394,101

PROTECTIVE COVERING FOR METAL ARTICLES AND METHOD OF APPLYING

Herman C. Phillips, Wilmington, Del., and Philip F. Robb, Birmingham, Mich., assignors to Hercules Powder Company, Wilmington, Del., a corporation of Delaware No Drawing. Application October 1, 1943, Serial No. 504,604

17 Claims. (Cl. 117—6)

This invention relates to the art of protecting the surfaces of metal articles during shipment, handling, storage, and the like.

A great amount of difficulty has been encountered in protecting and preserving the surfaces of metal articles from rusting, corrosion, and other damage likely to occur in the shipment, handling, and storage of such articles. This difficulty is particularly severe in the case of metal articles which have carefully and accurately machined and polished surfaces fabricated from iron and steel or other corrodible metals, such as for example, tools, machine parts, engine parts, gears, pistons, and the like. Exposure of such surfaces to dampness or other corrosive influences often cause such deterioration of the surface of the metal article as to render it useless for its intended purpose.

It is an object of this invention to provide a method of protecting the surfaces of metal articles to overcome the above-experienced difficulties.

It has been discovered in accordance with this invention that a metal article having corrodible surfaces may be protected from damage during the shipment, handling, and storage of the article which is required before it reaches its point of use, by applying to the article a plastic composition in molten condition composed of the following ingredients in the stated proportions:

|  | Parts |
|---|---|
| Ethyl cellulose (45.5 to 50% ethoxyl, 7 to 200 centipoises viscosity) | 100 |
| Solvent-type plasticizer | 25 to 150 |
| Non-solvent exuding-type plasticizer | 25 to 375 |
| Thermoplastic resin | 0 to 50 | and in which the total amount of plasticizer is within the range from about 100 parts to about 400 parts for each 100 parts of ethyl cellulose. The amount of molten plastic composition applied to the metal article to be protected will be sufficient to provide a continuous impervious covering over the article. The amount may be varied by suitable control of the dipping temperature, by variation of the viscosity and amount of ethyl cellulose, or by other means which will be obvious. The composition so formulated will be capable of ready removal from the article without damage thereto by any convenient means such as stripping after cutting through the covering, by cooling below normal temperatures and striking the article to fracture the covering, or by any other means which will suggest itself. It is convenient to insert during application a string or strip in the covering to be pulled at time of stripping, thereby facilitating the stripping operation. It will not be necessary to dissolve the covering off the protected article since the covering will not possess adhesion to the metal surface and will leave the surface entirely clean in the same manner that the surface of a mold becomes freed of the ejected molded part.

A significant feature of the invention is that the plastic composition need not contain any pigment or any other opacifying material, and consequently, may be made clear and transparent, thereby permitting quick and accurate visual inspection of the protected metal article either before shipment or before use, or at any other time, without the necessity of removing the protective covering. Another feature of the invention is that the metal article may be given its protective covering defined above in an entirely automatic manner without the necessity of human hand contact of the metal part. The latter feature is significant in the protecting of precision metal parts which are known to develop rusting at the point of contact with the hand.

The following specific examples of compositions which may be utilized as protective covering for metal articles are illustrative:

Example I

A plastic composition was prepared by heating the dibutyl phthalate and the mineral oil of the formulation appearing below to a temperature of about 150° C. and then adding the ethyl cellulose, the temperature being raised to about 180° C. and the heating continued until the ethyl cellulose was completely dissolved.

|  | Parts |
|---|---|
| Ethyl cellulose (47.5% ethoxyl, 100 centipoises viscosity) | 35 |
| Dibutyl phthalate | 10 |
| Mineral oil (Fractol A) | 45 |

This composition after cooling had a drop melting point of 128° C. and was completely transparent. A test piece of machined steel heated to a temperature of about 150° C. was dipped in the above composition in molten condition held at a temperature of about 200° C. The test piece was removed from the molten composition and allowed to drain while cooling to room temperature. A complete impervious covering was thereby obtained on the test piece. The covered test piece showed no corrosion when immersed in a salt water spray at 90° F. for 26 hours, no corrosion after immersing in salt water at 130 to 140°

F. for 168 hours, and no trace of corrosion after immersing in fresh water at 77° F. for 176 hours.

Example II

A plastic composition was prepared from the following ingredients by mixing the ingredients together and then colloiding the mixture on a heated two-roll mill at a temperature of about 150° C. until completely colloided:

| | Parts |
|---|---|
| Ethyl cellulose (47.5% ethoxyl, 100 centipoises viscosity) | 25 |
| Dibutyl phthalate | 13.5 |
| Mineral oil (Fractol A) | 58.5 |
| Lanolin | 3 |

The composition obtained had a drop melting point of 134° C. and was completely transparent. On application to a metal article having corrodible surfaces by a dipping procedure such as described in Example I a protective covering resulted which was impervious to water and water vapor over long periods.

Example III

In a similar manner to that shown in Example I a plastic composition was prepared from the following ingredients by heating all the ingredients except the ethyl cellulose to a temperature of 150° C., then adding the ethyl cellulose and continuing the heating until complete solution was effected, the maximum temperature reached being 180° C.:

| | Parts |
|---|---|
| Ethyl cellulose (47.5% ethoxyl, 100 centipoises viscosity) | 25 |
| Hydrogenated methyl abietate | 15 |
| Mineral oil (Fractol A) | 47 |
| Paraffin wax | 3 |
| Pentaerythritol ester of rosin | 10 |

The plastic composition so obtained had a drop melting point of 136° C. and was completely transparent. Application of the above composition to a metal article by a dipping operation such as described in Example I provided a protective covering on the metal article which prevented corrosion or rusting of the article when exposed to moisture or salt water.

Example IV

Using the same compounding procedure as described in Example III, a plastic composition was prepared from the following ingredients:

| | Parts |
|---|---|
| Ethyl cellulose (47% ethoxyl, 14 centipoises viscosity) | 35 |
| Hydrogenated methyl abietate | 25 |
| Corn oil | 20 |
| Paraffin wax | 3 |
| Pentaerythritol ester of rosin | 10 |
| Stabilizer (Agerite powder) | 1 |

The composition so obtained had a drop melting point of 121° C. and was transparent although exhibiting a slight haze. It showed no adhesion to metal surfaces. Application of the composition to a metal article by a dipping procedure provided a protective covering which was easily removable and which prevented corrosion of the metal article over a long period of time.

Examples V–IX

Plastic compositions were prepared from the following ingredients using the method of compounding described in Example III:

| | 5 | 6 | 7 | 8 | 9 |
|---|---|---|---|---|---|
| | Parts | Parts | Parts | Parts | Parts |
| Ethyl cellulose (47.5% ethoxyl, 100 centipoises viscosity) | 35 | 35 | 25 | 50 | 20 |
| Dibutyl phthalate | 35 | 10 | 15 | 37.5 | 5 |
| Mineral oil (Fractol A) | 10 | 35 | 60 | 12.5 | |
| Corn oil | | | | | 75 |
| Paraffin wax | 3 | | | | |
| Glycerol ester of hydrogenated rosin | 10 | | | | |
| Pentaerythritol ester of rosin | | 10 | | | |
| Melting point, °C | 126 | 141 | 128 | 131 | 126 |

Each of the compositions so formulated was transparent, showed no adhesion to metal surfaces and was highly resistant to moisture and salt water. Application of the above compositions to corrodible metal articles by a hot dipping procedure produced on the metal article a protective covering which protected the metal from corrosion.

Examples X–XIII

Plastic compositions were prepared from the following ingredients using the method of compounding described in Example III:

| | 10 | 11 | 12 | 13 |
|---|---|---|---|---|
| | Parts | Parts | Parts | Parts |
| Ethyl cellulose (47.5% ethoxyl, 100 centipoises viscosity) | 35 | 35 | 35 | 37 |
| Hydrogenated methyl abietate | 25 | 25 | 25 | 55 |
| Corn oil | 10 | 10 | | |
| Mineral oil (Fractol A) | | | 10 | 9 |
| Stearic acid | 10 | 5 | 5 | |
| Pentaerythritol ester of rosin | 10 | 15 | 15 | |
| Stabilizer (Agerite powder) | 1 | 1 | | |
| Melting point, °C | 128 | 134 | 133 | 129 |

Each of the above compositions was transparent, exhibited no adhesion to metal surfaces and was resistant to moisture and salt water. Application of each of the compositions to a corrodible metal article by a hot dipping procedure gave a covering on the metal article which protected its surface from corrosion and rusting over long periods of time and in the presence of moisture and salt water.

The ethyl cellulose which may be used in the plastic compositions useful in practicing the invention is rather critical as to ethoxyl content and viscosity. Ethyl cellulose of less than about 45.5% ethoxyl content has too high a fusion point, provides poor colloiding characteristics and exhibits graining. Similar deficiencies exist for ethyl cellulose of above 50% ethoxyl content. Viscosity types above about 200 centipoises are unsatisfactory, particularly on account of their low pourability. Very low viscosity types may be used since high strength characteristics are not of particular importance in the compositions. It has been found in accordance with this invention that the operable range of ethoxyl contents for use in the compositions of this invention is from 45.5 to 50%, and the operable range of viscosity is from about 7 up to about 200 centipoises. An ethoxyl content from about 46.8 to about 49% and a viscosity from about 14 to about 100 centipoises have been found particularly desirable and are preferred. The viscosities indicated are those of a 5% by weight solution of ethyl cellulose in a solvent mixture consisting of 80% toluene and 20% 2B-alcohol at 25° C.

The solvent-type plasticizer for the ethyl cellulose included in the compositions of the invention serves to soften the ethyl cellulose. Suitable solvent-type plasticizers are, for example, dibutyl phthalate, methyl abietate, ethyl abietate, hydrogenated methyl abietate, hydrogenated ethyl abietate, tricresyl phosphate, triphenyl phosphate, tributyl phosphate, butyl stearate, methyl phthalyl methyl glycollate, ethyl phthalyl ethyl glycollate, etc. The solvent-type plasticizer constituent may also be made up in whole or in part of a wax which is a solvent for ethyl cellulose, such as for example, montan wax, spermaceti wax, stearic acid, beeswax, Japan wax, hydrogenated castor oil, candelilla wax, etc. A preferred amount of solvent-type plasticizer will be from about 30 to about 100 parts for each 100 parts of ethyl cellulose.

The non-solvent, exuding-type plasticizer utilized in the compositions is necessary in the compositions of the invention to insure the non-adhesiveness to metal surfaces and thereby facilitates the stripping of the protective covering from the metal article. This class of plasticizers referred to is composed of those plasticizers which exert very little if any solvency power on ethyl cellulose but which exhibit the characteristic of exuding to the surface of ethyl cellulose compositions containing them. The exuding-type plasticizers fall into the following three categories, namely vegetable oils, mineral oils, and waxes which are non-solvents for ethyl cellulose. The vegetable oils which are particularly useful are for example, corn oil, castor oil, acetylated castor oil, coconut oil, cottonseed oil, soya bean oil, linseed oil, perilla oil, etc. The vegetable oils may be used in either their raw or bodied forms. Typical examples of mineral oils are light mineral oil, Fractol, Nujol, refined mineral oil, heavy mineral oil, etc. The mineral oil used will be one of relatively high flash point. Non-solvent waxes which are useful are, for example, paraffin wax, microcrystalline petroleum waxes, "Syncera" wax, "Barnsdall" wax, "Stanolind," "Superla," ceresin, Chinese insect wax, etc. A preferred amount of non-solvent, exuding-type plasticizer will be from about 30 parts to about 250 parts for each 100 parts of ethyl cellulose.

The total amount of plasticizer necessary in the compositions of the invention, i. e., including both the solvent-type plasticizer and the non-solvent, exuding-type plasticizer, to provide the described characteristics in the finished protective covering on the metal article is at least 100 parts of total plasticizer for each 100 parts of ethyl cellulose and may be as much as 400 parts of total plasticizer for each 100 parts of ethyl cellulose. Preferably, the amount of total plasticizer will be within the range from about 150 parts to about 300 parts per 100 parts of ethyl cellulose.

A resin is not essential in the plastic compositions, but it has been found that a small amount of a thermoplastic resin which is compatible with ethyl cellulose serves to improve the clarity of the plastic compositions and in some instances serves to improve the moisture resistance. The presence of a resin, however, in too large amount promotes undesired adhesion of the composition to the metal surface. It has been found that when a thermoplastic resin is used the amount of such resin must be restricted to no more than 50 parts for each 100 parts of ethyl cellulose in the total composition. The resins utilized should have low acid numbers to avoid any degrading influence on the ethyl cellulose at the elevated temperatures used in the dipping operation. Resins which are particularly suitable are the glycerol, pentaerythritol, or higher polyhydric alcohol esters of rosin, hydrogenated rosin, polymerized rosin, or heat-treated rosin, alkyd resins modified with any of the above rosins, oil-modified alkyds, maleic-modified rosin-polyhydric alcohol esters, phenol-formaldehyde resins modified with any of the above rosins, 100% phenolic resins, coumarone-indene resins, etc.

In several of the examples a stabilizer has been included. The presence of a stabilizer is not required but it has been found that when ethyl cellulose compositions are heated at elevated temperatures for prolonged periods of time, such as may occur in the dipping operation, some degradation and decrease in viscosity of the ethyl cellulose may occur in the absence of the stabilizing agent. Thus, the stabilizing agent is desirable when the composition is to be subjected to continued heating at elevated temperatures. Stabilizing agents which may be used are, for example, diphenylamine, phenyl beta naphthylamine, carbazole, diphenylguanidine, sym. dibetanaphthyl paraphenylene diamine, hydroquinone monobenzyl ether, hydroquinone monomethyl ether, hydroquinone monobutyl ether, hydroquinone monoamyl ether, copper salts such as copper naphthenate, cupric chloride, cupric acetate, etc. The Agerite powder used in Examples 4, 10 and 11 is phenyl beta-naphthylamine. The amount of stabilizer included in the composition will preferably be no more than the amount necessary to provide the desired heat stability and will not exceed about 5 parts per 100 parts of the fused composition. Preferably the amount of stabilizer used, if any is necessary, will be from about 0.5 to about 1.5 parts per 100 parts of composition.

The ingredients of the plastic compositions defined above may be compounded together either by a hot melt method involving stirring of the ingredients together while heating until a uniform composition is provided or by milling on hot rolls or in internal mixers of the Banbury type. The milling method is advantageous since it requires relatively lower temperatures for successful compounding than are necessary in the hot melt method. In using the hot melt method of compounding care should be exercised to prevent local superheating with consequent degradation of the ethyl cellulose. In employing the hot melt method temperatures of about 150° C. to about 240° C. are desirable, while in the case of the milling method the temperature of the heated rolls may be from about 135° C. to about 160° C. to provide plastic compositions of good uniformity. Other methods of compounding the ingredients of the compositions may be used if desired.

In applying the ethyl cellulose compositions described as useful in the invention to metal articles to provide a readily-removable protective covering thereon, the molten composition may be sprayed onto the metal article by any convenient spraying device, or the metal article may be dipped in the molten composition. By either method the amount of the composition which is allowed to remain on the metal article should be sufficient to provide a continuous impervious coating over the article. In general, the thickness of covering applied will be at least about 10 mils, and preferably at least about 20 mils. The hot dipping method will be preferred as a method of application since complete coverage of the metal article by the coating composition is insured. The temperature of the dipping composition for the dipping operation may be any temperature at which the composition is in a fluid condition, and may be from about 150° C. to about 250° C. and preferably from about 180° C. to about 220° C. Where possible, it is desirable to heat the metal article itself before applying the protecting composition since by this means the amount of composition retained on the metal article will be reduced to a minimum. The temperature of the metal article before application of the composition usually will not be above the temperature of the composition to be applied and generally will be somewhat lower.

It may be desirable in some instances to apply a light coating of a light oil to the metal article before applying the ethyl cellulose composition, the oil film serving to minimize any rusting or corrosion of the article before the ethyl cellulose composition is applied and further serving to facilitate the removal of the composition from the metal article when desired.

The metal article provided with the readily-removable protective covering of the ethyl cellulose composition described in accordance with this invention will be found to be satisfactory for shipment under adverse conditions of exposure to high humidity, high temperature, and salt water contact such as may be encountered in shipment by boat. It will also be found to withstand the conditions likely to prevail in the storage of metal articles either before or after shipment. The covered metal articles will resist corrosion and rusting under extreme conditions and will even withstand considerable immersion in salt water without corrosion or rusting of the metal surface.

The method of protecting surfaces of metal articles described in accordance with this invention will be found to be highly advantageous in the packaging and shipping of metal parts for machines, motors, airplanes, and airplane engines where a precision surface must be maintained on the metal article. Thus, the method described in accordance with this invention will be found ideally adapted to the shipment of repair and replacement parts for airplanes and other mechanical devices.

In referring to parts of ingredients included in the ethyl cellulose compositions utilized in accordance with this invention throughout the specification and in the claims, parts by weight are intended.

What we claim and desire to protect by Letters Patent is:

1. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

2. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 150 parts to about 300 parts for each 100 parts of ethyl cellulose, the amount of said composition applied to said article being sufficient to provide a continuous impervious covering over the article, said covering being readily removable from the surface of the article when the article is to be used.

3. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Mineral oil | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

4. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Dibutyl phthalate | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

5. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Dibutyl phthalate | 25 to 150 |
| Mineral oil | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

6. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Hydrogenated methyl abietate | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

7. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Hydrogenated methyl abietate | 25 to 150 |
| Plasticizer which exerts substantially no solvency on the ethyl cellulose but which exhibits the characteristic of exuding to the surface of ethyl cellulose compositions containing it | 25 to 375 |
| Pentaerythritol ester of rosin | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

8. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Hydrogenated methyl abietate | 25 to 150 |
| Mineral oil | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

9. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

10. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Mineral oil | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

11. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Dibutyl phthalate | 25 to 150 |
| Plasticizer which exerts substantially solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

12. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Dibutyl phthalate | 25 to 150 |
| Mineral oil | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

13. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Hydrogenated methyl abietate | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

14. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Hydrogenated methyl abietate | 25 to 150 |
| Plasticizer which exerts substantially no solvency on the ethyl cellulose but which exhibits the characteristic of exuding to the surface of ethyl cellulose compositions containing it | 25 to 375 |
| Pentaerythritol ester of rosin | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

15. As a new product, a metal article provided with a readily-removable, impervious covering for protection during shipment, handling, storage, and the like, said covering comprising a plastic composition comprising the following ingredients in the stated proportions:

| | Parts |
|---|---|
| Ethyl cellulose (45.5% to 50% ethoxyl, 7 to 200 centipoises viscosity) | 100 |
| Hydrogenated methyl abietate | 25 to 150 |
| Mineral oil | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, the amount of said composition applied to said article being sufficient to provide a continuous impervious covering over the article, said covering being readily removable from the surface of the article when the article is to be used.

16. In the art of protecting metal articles during shipment, handling, storage, and the like, the process of applying to said article a molten composition comprising the following ingredients:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 100 parts to about 400 parts for each 100 parts of ethyl cellulose, said composition also containing from about 0.5 to about 5 parts stabilizer per 100 parts of total composition, the amount of said composition applied to said article being sufficient to provide a continuous impervious covering over the article, said covering being readily removable from the surface of the article when the article is to be used.

17. As a new product, a metal article provided with a readily removable, impervious covering for protection during shipment, handling, storage, and the like, said covering comprising the following ingredients in the following stated proportions:

| | Parts |
|---|---|
| Ethyl cellulose (45.5% to 50% ethoxyl, 7 to 200 centipoises viscosity) | 100 |
| Plasticizer having solvent action on the ethyl cellulose | 25 to 150 |
| Plasticizer which exerts substantially no solvency on the ethyl cellulose but which exhibits the characteristic of exuding to the surface of ethyl cellulose compositions containing it | 25 to 375 |
| Thermoplastic resin which is compatible with ethyl cellulose | 0 to 50 | the total amount of plasticizer included in the composition being within the range from about 150 parts to about 400 parts for each 100 parts of ethyl cellulose, said composition also containing from about 0.5 to about 5.0 parts stabilizer per 100 parts of the total composition, the amount of said composition applied to said article being sufficient to provide a continuous impervious covering over the article, said covering being readily removable from the surface of the article when the article is to be used.

HERMAN C. PHILLIPS.
PHILIP F. ROBB.